(12) United States Patent
Gutkuhn et al.

(10) Patent No.: US 9,745,080 B2
(45) Date of Patent: Aug. 29, 2017

(54) ACCESS TUNNEL TO AN AIRCRAFT

(71) Applicant: Hübner GmbH & Co. KG, Kassel (DE)

(72) Inventors: Detlef Gutkuhn, Espenau (DE); Kai Mander, Wolfhagen (DE); Lothar Scharf, Bad Sooden-Allendorf (DE); Hermann Benkhoff, Duderstadt (DE); Reinhard Hübner, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 15/189,328

(22) Filed: Jun. 22, 2016

(65) Prior Publication Data

US 2016/0376030 A1 Dec. 29, 2016

(30) Foreign Application Priority Data

Jun. 24, 2015 (EP) .................................. 15173521

(51) Int. Cl.
*B64F 1/30* (2006.01)
*E04H 15/36* (2006.01)
*B64F 1/305* (2006.01)

(52) U.S. Cl.
CPC ............... *B64F 1/30* (2013.01); *B64F 1/305* (2013.01); *E04H 15/36* (2013.01)

(58) Field of Classification Search
CPC . B64F 1/30; B64F 1/305; E04H 15/36; A63B 2009/006; Y10S 135/906; Y10S 135/912; E04G 21/3209; E04B 1/348; E04B 1/3431; E04B 1/34331; E04B 1/34336

USPC ..... 135/141, 906, 912; 52/67, 79.8; 14/69.5, 14/71.5, 72.5
See application file for complete search history.

(56) References Cited

U.S. PATENT DOCUMENTS

| | | | | | |
|---|---|---|---|---|---|
| 2,470,337 | A | * | 5/1949 | Campbell | E04F 10/02 135/131 |
| 3,131,705 | A | * | 5/1964 | Marino | B60P 7/04 135/131 |
| 3,256,896 | A | * | 6/1966 | Cummins | B60J 7/062 135/131 |
| 4,150,682 | A | * | 4/1979 | Ryce | E04H 15/52 135/120.1 |
| 5,156,195 | A | * | 10/1992 | Wehler | B23Q 11/0825 160/202 |
| D366,530 | S | * | 1/1996 | Spitz | D25/18 |
| 5,839,462 | A | * | 11/1998 | Randall | E04H 6/04 135/128 |
| 6,055,692 | A | * | 5/2000 | Pell | B64F 1/305 14/71.5 |
| 6,210,247 | B1 | * | 4/2001 | Rodriguez Ferre | A63B 9/00 446/476 |

(Continued)

FOREIGN PATENT DOCUMENTS

DE 3504513 8/1986
FR 2886624 A1 12/2006

(Continued)

*Primary Examiner* — Robert Canfield
(74) *Attorney, Agent, or Firm* — Dinsmore & Shohl LLP

(57) ABSTRACT

An access tunnel to an aircraft includes a plurality of tunnel elements each having a longitudinal axis, each tunnel element tapering conically in the direction of the longitudinal axis such that the tunnel elements can be pushed into each other.

22 Claims, 4 Drawing Sheets

(56) References Cited

U.S. PATENT DOCUMENTS

| | | | |
|---|---|---|---|
| 7,069,611 B2* | 7/2006 | Larson | B64F 1/30 |
| | | | 14/71.1 |
| 8,904,714 B2* | 12/2014 | Montalto | E04G 21/3209 |
| | | | 108/131 |
| 2015/0191258 A1 | 7/2015 | Gutkuhn et al. | |

FOREIGN PATENT DOCUMENTS

| WO | WO-0188274 A1 | 11/2001 |
|---|---|---|
| WO | WO-2014040584 | 3/2014 |

* cited by examiner

ACCESS TUNNEL TO AN AIRCRAFT

CROSS REFERENCE TO RELATED APPLICATION

This application claims priority to European Application Ser. No. EP 15 173 521.4 filed Jun. 24, 2015, which is incorporated herewith in its entirety by reference thereto.

FIELD OF THE INVENTION

The present invention relates generally to an aircraft tunnel comprising a plurality of tunnel elements which are displaceably connected to each other.

BACKGROUND OF THE INVENTION

An access tunnel to an aircraft, for example from a parked bus or from a part of a building, is sufficiently known from the prior art. Such access tunnels are used when access to the aircraft should be made possible for passengers from an exit of a building at ground level to the taxiway area without them being exposed to weather conditions. Such access tunnels are known, as already stated.

For example, PCT/DE2013/000513 discloses an access tunnel which has a plurality of tunnel elements, whereby the access tunnel can be adapted to the required length. It is known in detail from this citation to displace two elements into one another to protect the individual tunnel elements from contamination, and also from weather effects overall. Provision is made in this respect that a substantially rigid tunnel element as a base element has at least one further tunnel element formed for extension in the manner of a concertina, with the substantially rigid tunnel element as the base element being able to receive the tunnel element formed in the manner of a concertina in it in the manner of a garage.

FR 2 886 624 A also discloses an access tunnel to an aircraft which has a plurality of telescopic tunnel elements and two rigid tunnel elements at the end sides which are intended to serve as guide elements on the moving of the access tunnel. The access tunnel described there is thus variable in length. This means that the space requirements of the access tunnel on the airport ramp are variable.

An access tunnel to an aircraft is likewise known from WO 01/88274, wherein individual tunnel elements are telescopically connected to one another. It is disadvantageous therein that if a plurality of such tunnel elements are telescopically connected to one another, the clearance width reduces more and more over the length of the tunnel element. This means that the number of the tunnel elements connected in such a manner are absolutely limited. It has furthermore been found to be disadvantageous that, due to the guiding of the individual tunnel elements into one another, a substantial force requirement is necessary to pull the individual elements apart to form the access tunnel. This is because, as already stated, the frameworks of the individual tunnel elements are connected to one another in a guided manner. It would be desirable to overcome the limitations of existing known access tunnels and to provide a better solution.

SUMMARY OF THE INVENTION

It is an objective of the invention to connect a plurality of tunnel elements to one another such that they can be stored in one another in a space-saving manner without the clearance width reducing as the number of tunnel elements increases.

According to one embodiment in accordance with the invention, a plurality of the tunnel elements are formed as tapering conically in the direction of the longitudinal axis of each tunnel element such that the tunnel elements can be pushed into one another. It becomes clear from this that all of the tunnel elements are formed the same, that is each tunnel element has the same respective clearance width at both ends, with each tunnel element, however, having a larger passage width at one end than at the oppositely disposed end. The already previously named conical design of the tunnel elements results from this. This conical design of the tunnel elements, however, has the effect that the individual tunnel elements are displaceable into one another for a space-saving storage in a similar manner to shopping carts.

Provision is thus made in accordance with a special feature of the invention that the tunnel elements are freely displaceable relative to one another. This means that the individual tunnel elements are not, for example, connected to one another by guides, but are rather freely movable relative to one another in almost any position. This is also due to the conical design of the tunnel elements. In order now in this connection to prevent the tunnel elements from being pulled apart such that these tunnel elements each stand freely per se, provision is made that the tunnel elements are connected to one another extending in the longitudinal direction by cord, chain, rope, cable or similar to limit the extension. This means that the individual tunnel elements are not guided in one another; they are only connected to one another by the previously described cords, for example, to limit the extension such that the force effort to pull apart the tunnel elements is minimal.

The tunnel element comprises a framework on which a cover is arranged, wherein the cover is of arcuate design in its roof. In this connection, the framework has a frame of archway shape at both ends, with the one frame of archway shape being smaller with respect to the circumference than the other frame of archway shape for the conical formation of the tunnel element. A frame of archway shape is understood as one which has two substantially vertically oriented limbs which are connected to one another by an arcuate web in the roof region of the tunnel element so that the frame of archway shape is formed in substantially U shape when viewed.

To prevent water from penetrating into the interior of the access tunnel formed by the tunnel elements in the pulled-apart state of the tunnel elements and in the associated radial spacing due to the conical design of the tunnel elements, the frame of archway shape which is larger in circumference has a seal of corresponding archway shape with respect to the adjacent tunnel element. The seal of archway shape is of a flexible design to ensure the leak tightness by the seal on the pushing together of the tunnel elements or on their pulling apart. In accordance with a special feature, provision is made in this connection that the seal of archway shape is elastic at least in the roof region of the tunnel element. Elastic is understood such that the seal is designed in a similar manner to an elastic band in the roof region. Provision is advantageously furthermore made in this connection that the elastic seal of archway shape lies under strain on the cover of the adjacent tunnel element in the roof region of the tunnel element to ensure a very high degree of leak tightness with respect to penetrating moisture. The seal in the region of the limbs of the frame of archway shape is in this respect only flexible in the manner of a cloth which prevents water entering between the vertical side surfaces of two adjacent tunnel elements in driving rain.

A seal has been found to be particularly durable which has a reinforcement material coated with an elastomer at at least one side; this means that the seal of archway shape comprises, e.g. in the manner of plastic tarpaulin, a fabric coated with an elastomer. Provision is furthermore made in accordance with a special feature of the invention that the frame of archway shape which is smaller in circumference has two essentially vertically extending limbs at which a respective guidance device for persons proceeding through the access tunnel is arranged. It has already been pointed out at another passage that the tunnel elements are conical, with each tunnel element having a larger frame of archway shape at a front end than at the oppositely disposed end. This means that when the tunnel elements are pulled apart to form an access tunnel, there is a radial spacing between the inner smaller frame of archway shape and the outer larger frame of archway shape of the adjacent tunnel element. To prevent passengers in a crowd from running against the smaller frame of archway shape of the one tunnel element at the front, a respective guidance device is arranged at the essentially vertically extending limbs. Such a guidance device is advantageously designed as a wing pivotable about a vertical axis, that is the wing is arranged in a manner similar to a swing door at the frame of archway shape which is smaller in circumference. The wing is under the load of a spring which provides that the wing is urged in the direction of the frame of the adjacent tunnel element. The pivotable wing advantageously extends approximately over the length or over the height of the limb of the frame of archway shape to save the passengers using the access tunnel from colliding with the frame of archway shape.

Provision is furthermore made that the radial spacing between the smaller and the larger frames of archway shape of two tunnel elements is such that, in the substantially pulled apart state of two tunnel elements, the latter can stand at an angle with respect to one another. This means that the circumference of the two frames of archway shape of the tunnel elements is by all means significantly different since the tunnel elements can thereby only be displaced at an angle with respect to one another to allow a flexible shape of the access tunnel overall.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
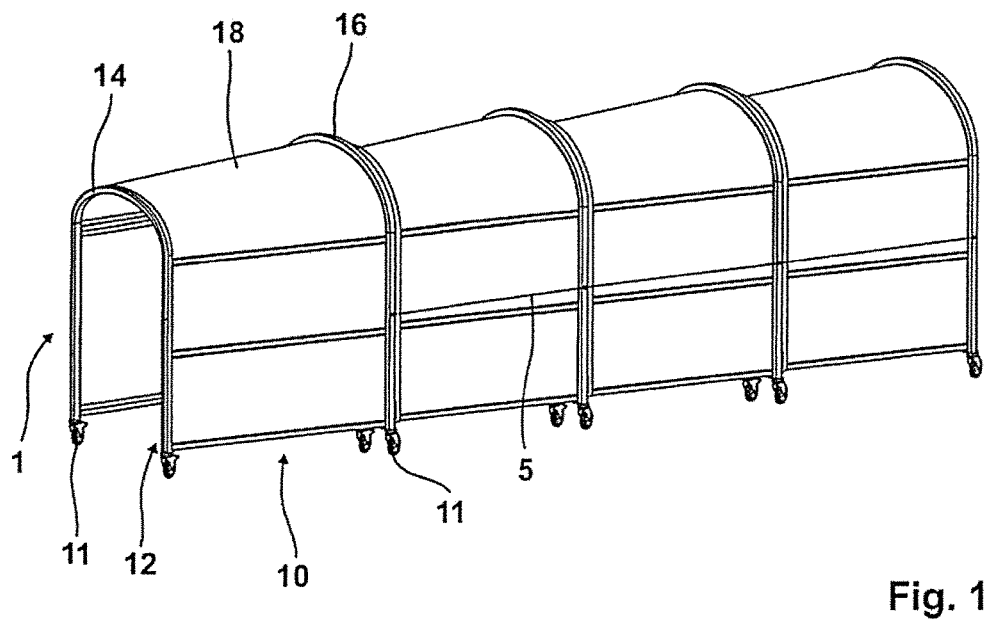
FIG. 1 shows an access tunnel with a plurality of elements in the pulled-apart state in a perspective representation.
Figure 1A:
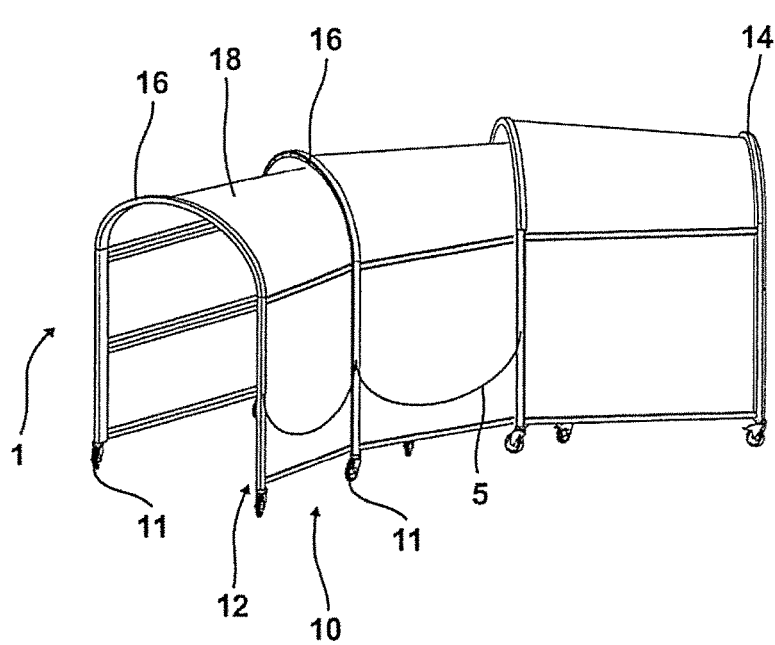
FIG. 1a shows the access tunnel of FIG. 1 in a curved state in the reverse order of the tunnel elements.
Figure 2:
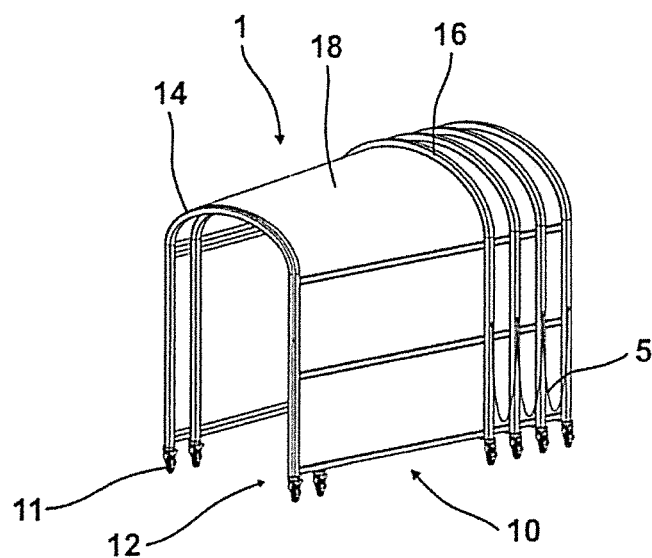
FIG. 2 shows a representation of FIG. 1, with the tunnel elements being pushed into one another.

An access tunnel 1 having a total of four tunnel elements 10 results from FIG. 1. Each tunnel element 10 has a framework 12 having four rollers 11, wherein the framework 12 has a smaller frame 14 of archway shape at one end and a frame 16 of archway shape which is larger in comparison therewith at the opposite end. The term "smaller frame of archway shape" is to be understood in this respect in relation to the term "larger frame of archway shape"; that is, the smaller frame of archway shape has a smaller circumference than the frame 16 of archway shape larger in relation thereto such that a conical extent of the individual tunnel elements 10 results in the longitudinal direction, as is shown in FIG. 1. The cornering of an access tunnel 1 having a plurality of tunnel elements 10 is shown in FIG. 1a. The framework marked by 12 has a cover 18, for example composed of a transparent plastic, over its circumference.

Figure 3:
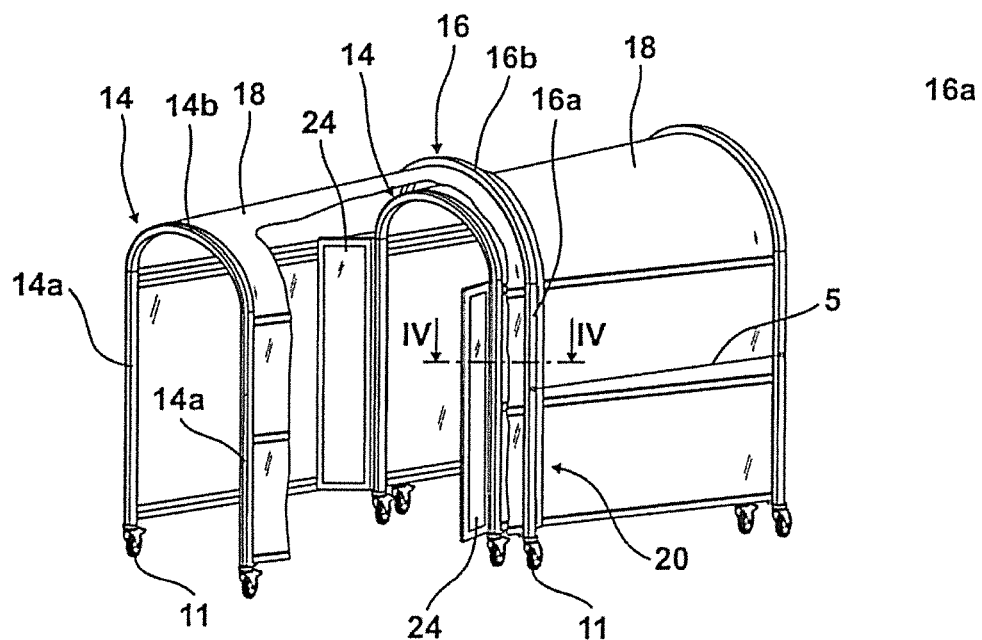
FIG. 3 shows two tunnel elements, with wings as guiding devices being visible through an opening.
Figure 4:
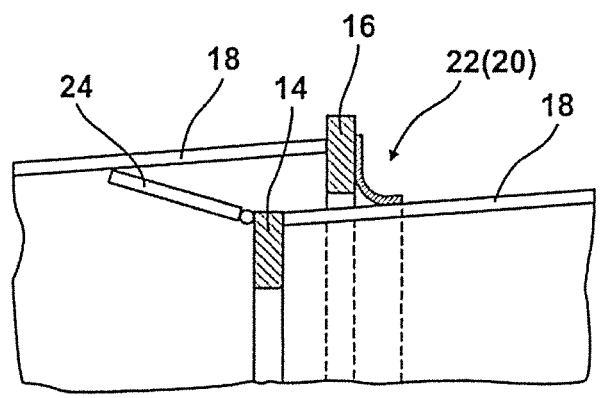
FIG. 4 shows a section in accordance with the line IV-IV of FIG. 3.
Figure 5:
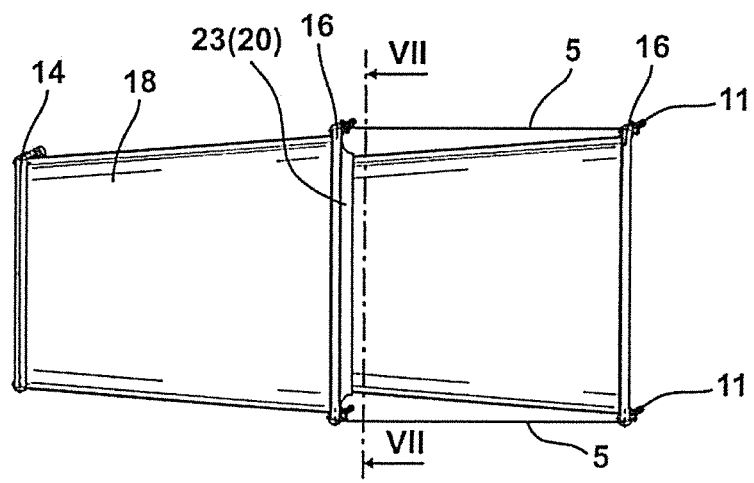
FIG. 5 shows a top view of two tunnel elements in the pulled-apart state.
Figure 6:
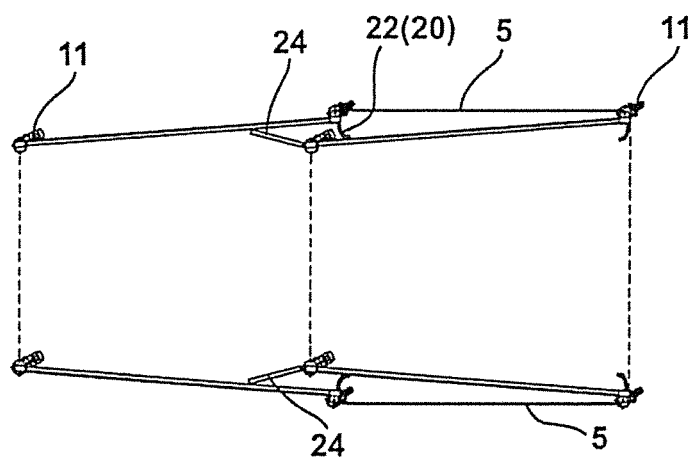
FIG. 6 shows a horizontal section in a view from above.

The individual tunnel elements 10 are connected to one another by cords 5 to limit the extension of the tunnel elements among one another. Such a cord is located at each side of the tunnel elements. The fastening of the cords 5 takes place between the vertical limbs 14a and 16a of the frames 14 and 16 of archway shape (see also FIG. 3). The two limbs 14a, 16a of each frame 14, 16 of archway shape are connected to one another by a respective arcuate web 14b, 16b in the roof region. The frame 16 of archway shape which is larger in relation to the smaller frame 14 of archway shape has a seal 20 likewise of archway shape for bridging the spacing between two tunnel elements 10 in the pulled-apart state of these tunnel elements (see FIG. 3). The seal 20 of archway shape is marked by 22 in the region of the limbs 16a of the larger frame 16 of archway shape and contacts the cover of the respective adjacent tunnel element 10 (FIG. 4). The seal 20 of archway shape comprises a reinforcement carrier, for example a fabric, which is coated by an elastomer at at least one side. This cloth is easily deformable and, as already stated, lies at the cover of the adjacent tunnel element 10.

The seal 20 of archway shape in the roof region (arrow 23) is elastic per se, that is, is formed in the manner of an elastic band, whereby it is achieved that the seal 20 of archway shape lies under strain on the cover 18 of the adjacent tunnel element in the roof region. This is against the background that in particular no water should be able to enter into the transition region of two tunnel elements in the roof region.

If now FIG. 3 is again looked at, the wings 24 can be recognized at the vertical limbs 14a of the frame 14 of archway shape which is smaller in relation to the frame 16 of archway shape, the wings being formed as a guide device and being arranged at the limbs 14a pivotable about a vertical axis. The joints of the wings for the connection to the limbs 14a are designed in this respect such that the wings 24 come to rest in any predefined position. These wings 24 serve as a guide device or passengers passing through the access tunnel to avoid any collision of the passengers with the frame 14 of archway shape.

LIST OF REFERENCE NUMBERS 1 access tunnel
5 cords
10 tunnel element
11 rollers
12 framework
14 frame
14*a* limb
14*b* web
16 frame
16*a* limb
16*b* web
18 cover
20 seal
22 seal, limb
23 seal, roof (arrow)
24 wing

The invention claimed is:

1. An access tunnel to an aircraft, comprising:
a plurality of tunnel elements each having a longitudinal axis, each tunnel element tapering conically in the direction of the longitudinal axis such that the tunnel elements can be pushed into each other.

2. The access tunnel of claim 1, wherein the plurality of tunnel elements are displaceably connected to each other.

3. The access tunnel of claim 1, wherein the tunnel elements are connected to each other by cords, chains, ropes or cables to limit extension.

4. The access tunnel of claim 1, wherein each tunnel element comprises a framework on which a cover is arranged.

5. The access tunnel of claim 4, wherein the framework comprises a frame having an archway shape at each end, with one frame of the archway shape being smaller with respect to a circumference than the other frame of archway shape, thereby providing the conical tapering of each tunnel element.

6. The access tunnel of claim 5, wherein the frame having an archway shape which is larger in circumference has a seal with an archway shape corresponding to an adjacent one of the tunnel elements.

7. The access tunnel of claim 6, wherein the seal of archway shape is flexible.

8. The access tunnel of claim 6, wherein the seal of archway shape is elastic at least in a roof region of the tunnel element.

9. The access tunnel of claim 6, wherein the seal of archway shape has a reinforcement carrier coated with an elastomer on at least one side.

10. The access tunnel of claim 8, wherein the elastic seal of archway shape lies under strain on the cover of the adjacent tunnel element in the roof region of the tunnel element.

11. The access tunnel of claim 5, wherein the frame of archway shape smaller in circumference has two essentially vertically extending limbs, and the tunnel element further comprising two guide devices each arranged on one of the essentially vertically extending limbs.

12. The access tunnel of claim 11, wherein each guide device is formed as a wing pivotable about a vertical axis.

13. The access tunnel of claim 12, wherein each pivotable wing extends over approximately a length of the limb of the frame of archway shape.

14. The access tunnel of claim 5, wherein a radial spacing between the smaller and larger frames of archway shape of two tunnel elements is such that, in a substantially pulled-apart state of two tunnel elements, the latter can stand at an angle with respect to the other.

15. An access tunnel for access to an aircraft, comprising:
a first tunnel element having a first frame at a first end and a second frame at a second end, the first frame being smaller than the second frame and thereby providing a tapering conical shape to the first tunnel element; and
at least one second tunnel element, the second tunnel element being connected to the first tunnel element, the second tunnel having a third frame at a third end and a fourth frame at a fourth end, the third frame being smaller than the fourth frame and thereby providing a tapering conical shape to the second tunnel element;
wherein the third frame of the at least one second tunnel element slides into the second frame of the first tunnel element.

16. The access tunnel of claim 15, further having rollers attached to the first tunnel element and/or the at least one second tunnel element.

17. The access tunnel of claim 15, wherein the first tunnel element and the at least one second tunnel element are connected by a cord, chain, rope and/or cable.

18. The access tunnel of claim 15, wherein the second frame has a flexible seal configured to seal to the third frame of the at least one second tunnel element.

19. The access tunnel of claim 18, wherein the seal is elastic at least in a roof region.

20. The access tunnel of claim 18, wherein the seal has a reinforcement carrier coated with an elastomer on at least one side.

21. The access tunnel of claim 15, wherein the third frame further comprises:
two vertically extending limbs, each having a height; and
a respective guide device attached to each of the vertically extending limbs.

22. The access tunnel of claim 21, wherein each guide device is a wing pivotable about a vertical axis, each pivotable wing extending over approximately the height of the limb.

* * * * *